3,363,001
FLUORO CYCLOHEXENYL OR CYCLOPENTENYL
PHENYL SULFIDES
Melvin M. Schlechter, New Hyde Park, N.Y., and Richard
F. Sweeney, Dover, N.J., assignors to Allied Chemical
Corporation, New York, N.Y., a corporation of New
York
No Drawing. Filed Apr. 5, 1965, Ser. No. 445,730
13 Claims. (Cl. 260—609)

ABSTRACT OF THE DISCLOSURE

Unsaturated, aromatic, halogen-containing thioethers having the formula:

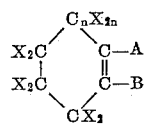

wherein X is fluorine or chlorine, $n$ is 0 or 1, and A and B are chlorine or an —S—R radical wherein R is phenyl, phenylalkyl, or alkylphenyl, with the proviso that at least one of A and B must be —S—R, there being at least one fluorine atom and one chlorine atom in the molecule, are prepared by base-catalyzed reaction of perhaloalkenes having the formula:

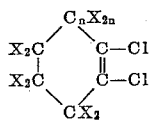

wherein X and $n$ have the aforestated meanings, with a thiol of the formula R—SH, wherein R has the aforestated meaning. The thioethers are useful as solvents and sealants for polymers, terpolymers, and copolymers of chlorotrifluoroethylene.

---

This invention relates to the production of a novel class of unsaturated, aromatic, halogen-containing thioethers.

An object of this invention is to provide a novel class of chemical compounds and more particularly to provide a class of halogenated cyclopentenyl and cyclohexenyl-thioethers, hereinafter referred to as thioethers, which thioethers are characterized by the presence of a phenylthio, phenylalkylthio or alkylphenylthio group on one or both of the unsaturated carbon atoms of the cycloalkenyl group, the remaining unsaturated carbon atom of the cycloalkenyl group, if any, being substituted with chlorine and all of the saturated cyclic carbon atoms being perhalogenated with either fluorine or chlorine atoms, there being present at least one fluorine atom and one chlorine atom in the molecule.

Another object of the invention is to provide a process for the production of the above-described thioethers.

Other objects and advantages of the invention will become apparent from a consideration of the following description and discussion of the subject invention.

The novel thioethers of the invention may be represented by the following formula:

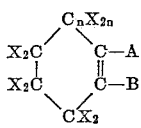

wherein X may be F or Cl, $n$ may be 0 or 1 and A and B may each be a member selected from the group consisting of Cl and S—R, wherein R is a member selected from the group consisting of phenyl, phenylalkyl and alkylphenyl, with the proviso that at least one of the members A and B must be the member S—R, there being present at least one fluorine atom and one chlorine atom in the molecule.

It has been found that thioethers, as above-described, have utility as solvents for polymers, terpolymers and copolymers of trifluorochloroethylene and as sealing adjuvants for films of such polymers.

The novel thioethers of the invention may be prepared by reacting the corresponding 1,2-dichloroperhalocycloalkene-1 of the formula:

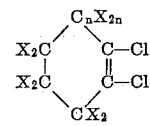

wherein X may be F or Cl and $n$ may be 0 or 1, there being at least one fluorine atom present in the molecule, with a thiol of the formula:

R—SH wherein R is a member selected from the group consisting of phenyl, phenylalkyl and alkylphenyl, preferably containing from 6–12 carbon atoms, and an inorganic base, in the presence of an inert polar solvent, preferably an alkanol.

Inorganic bases utilizable must be soluble in the solvent to be employed and are exemplified by the following: alkali metal hydroxides, alkali metal carbonates, alkaline earth metal hydroxides and alkaline earth metal carbonates.

Inert polar solvents are well known in the art, ethyl alcohol, dioxane, diglyme and dimethylformamide being illustrative.

The preferred alkanol solvent may be straight or branched chain and may contain any feasible number of carbon atoms. Illustrative members of this group include methanol, ethanol, isopropanol, n-butanol and neopentanol.

The reaction may be illustrated by the following equation:

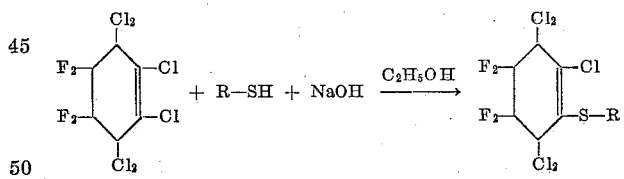

wherein R is as defined supra.

In an excess of R—SH and NaOH reactants, the corresponding bis compounds, viz. compounds of the formula:

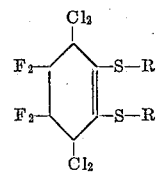

will be formed, wherein R is as defined above.

Where the corresponding halogenated cyclopentenyl mono- or bisthioethers are desired, the corresponding 1,2-dichloroperhalocyclopentene(s)-1 are employed and the reaction proceeds substantially in the same way.

There is no criticality in the number of carbon atoms which may be contained in the aromatic radical of the R—SH reactant. The only limitations are the practical ones of stability and solubility of the resulting thiol molecule in the reaction medium to be employed.

The thiol reactants (R–SH) may be prepared, as is known in the art, by the reaction of the corresponding aryl halides with sodium or potassium hydrosulfide. Alternatively, such materials may be prepared indirectly by reaction of the corresponding aryl halides with thiourea to produce the corresponding S-aryl isothiouronium salts, which in turn may be hydrolyzed to the corresponding thiols with NaOH.

The 1,2-dichloroperhalocycloalkene-1 starting materials may be prepared by known procedures which are reported in the literature. For example, perchlorocyclopentene may be fluorinated with $SbF_3$ to a mixture of 1,2-dichloroperhalocyclopentene(s)-1 in which the halogen atoms consist of varying proportions of fluorine to chlorine and which fluorine may be in a variety of positions. This procedure is reported by Henne et al., J.A.C.S., vol. 67, No. 8 (Aug. 9, 1945) pp. 1235–36. The corresponding 1,2-dichloroperhalocyclohexene(s)-1 may be prepared by an analogous procedure and also by fluorinating hexachlorobenzene with $SbF_5$ at temperatures below about 160° C., as reported by Leffler, J. Org. Chem., vol. 24 (1959), pp. 1132–33.

The reaction of the invention may be carried out in conventional vessels constructed of ordinary materials, such as Pyrex or steel, which vessels are preferably equipped with stirring means, condensing means and means for adding the thiol reactant slowly, such as a dropping funnel.

The process affords the advantages of operation at atmospheric pressures and at low temperatures. Superatmospheric or subatmospheric pressures may be employed, however, with no particular benefit.

The reaction may be carried out over a relatively wide range of temperatures, the upper limit being the boiling point of the solvent employed. Temperatures below about 30° C. are generally preferred for good results. Better results are obtained when the reaction is carried out at temperatures between about 0–20° C. and optimum results are obtained when temperatures are maintained between about 0–10° C. Temperatures below about 0° C. are operable, however, decreased yields are obtained due to the increase in viscosity of the reactant solutions.

The reaction is mildly exothermic and accordingly it is necessary to positively control the reaction temperatures to within the desired limits. This may be accomplished by regulation of mixing of the reactants to control exotherm, by removal of heat of reaction, by any conventional cooling means, or by any combination of the above.

For maximum yields of the monothioether products, the 1,2-dichloroperhalocycloalkene-1 (hereinafter referred to as olefin), thiol and inorganic base reactants are employed in their stoichiometric amounts, i.e. equimolar portions. As little as 0.1 mole of inorganic base per mole of olefin may be used and the reaction will proceed, except that diminished yields of the corresponding thioether product will be obtained. Similarly, if the concentration of the thiol reactant with respect to the olefin is reduced, the reaction will proceed but proportionately less of the desired thioether product will be obtained. An excess of either of the thiol reactant or the inorganic base reactant will not deleteriously affect the reaction.

For maximum yields of the bisthioether products, the thiol and inorganic base reactants are each employed in a 2:1 stoichiometric ratio based on the olefin reactant. When more than one and less than two moles of either of the thiol or inorganic base reactants are employed, bisthioether products will be formed, although in proportionately diminished yields.

The amount of solvent required is that amount needed to keep the reactants in solution. Generally, 1–50 parts by volume of solvent per combined parts of the other reactants will serve this purpose. Preferably, about 5–10 parts by volume of solvent per combined parts of the other reactants are employed.

The preferred mode for preparing the thioethers comprises adding the thiol reactant to a solution of the inorganic base reactant in the solvent, which resulting solution is then slowly added to a solution containing the olefin reactant in the solvent. The olefin, thiol and inorganic base reactants may be mixed simultaneously, however, or the thiol reactant added to the olefin, followed by addition of the inorganic base and the solvent may be incorporated in any convenient manner.

The products, particularly the monothioethers, are normally liquids and may be recovered, as is conventional in the art, such as by extraction and drying, followed by ordinary distillation. If solid products are formed, as is the case with many of the bisthioether products, such may also be purified and recovered by conventional procedures, such as by filtration or distillation to remove organic liquids followed by recrystallization from a suitable solvent, such as a benzene-petroleum ether mixture.

The products and process of the invention are further illustrated by the following examples in which parts and percentages are by weight, unless otherwise indicated.

EXAMPLE 1

A three-necked flask, equipped with a water cooled condenser, dropping funnel and stirrer was charged with 150 ml. of ethanol and 16.0 g. (0.400 mole) of sodium hydroxide. The resulting mixture was heated until solution was complete, at which time the solution was allowed to cool to room temperature. To the mixture at room temperature were added 49.6 g. (0.400 mole) of benzenemethanethiol. Upon addition of this material, the solution turned orange in color and the resulting orange solution was added slowly, with stirring, to a chilled solution of 108 g. (0.366 mole) of 1,2-dichlorooctafluorocyclohexene-1 in 100 ml. of ethanol. Temperature of the reaction mixture was maintained between about 0–10° C. throughout the addition, by quenching the reaction vessel in ice-water. After completion of the addition, the orange organic layer separated and was washed with small portions of water. The orange organic portion was then taken up in methylene chloride and dried over sodium sulfate. Following solvent removal, the residual oil was distilled and 27.5 g., corresponding to a yield of about 18%, of a yellow oil, identified as 1-(benzylthio)-2-chlorooctafluorocyclohexene-1 (B.P. 110–116° C./3–4 mm.), were recovered.

*Analysis.*—Calculated for $C_{13}H_7F_8ClS$: C, 40.8%; H, 1.83%; F, 39.7%; Cl, 9.28%; S, 8.37%. Found: C, 40.9%; H, 1.80%; F, 37.5%; Cl, 9.60%; S, 8.48%.

Infrared spectrographic analysis showed the following absorptions in microns (w=weak, s=strong): 3.25 (w), 3.39 (w), 6.30 (s), 6.66 (w), 6.84 (w), 7.45 (s), 7.81 (w), 8.15 (s), 8.28 (s), 8.55 (s), 8.88 (s), 9.56 (s), 10.08 (s), 11.35 (s), 11.91 (s), 14.25 (s). The strong absorption peak at 6.30 microns confirmed the presence of an unsaturated double bond. Strong absorption signals in the area of the C—F stretch region (8.15–8.55 microns) confirmed the presence of C—F bonds. Weak absorption signals in the area of the C—H stretch region (3.25–3.39 microns) confirmed the presence of C—H bonds. The infrared analysis was thus consistent with the expected structure.

EXAMPLE 2

The process of Example 1 is repeated except that the three-necked flask is initially charged with 250 ml. of ethanol and 32.0 g. (0.800 mole) of sodium hydroxide. The amount of benzenemethanethiol added to this mixture is 99.2 g. (0.800 mole). The resulting mixture is added to a chilled solution of 120 g. (0.366 mole) of 1,2,3,3-tetrachlorohexafluorocyclohexene-1 in 100 ml. of ethanol as before. Reaction temperature is maintained between about 0–10° C. and about 27.5 g. of 1,2-bis(benzylthio)-3,3-dichlorohexafluorocyclohexene-1 are recovered.

EXAMPLES 3–9

The processes of Examples 1 and 2 are repeated with the reactants listed in the indicated columns of Table I. The corresponding mono- and bisthioether products obtained are listed oppositely in the last column. In Examples 3–6 KOH is used as the inorganic base and isopropanol is used as the solvent. In Examples 7–9 Na₂CO₃ is used as the inorganic base and dimethylformamide is used as the solvent.

*Table I*

| Example | Halogenated Cycloalkene Reactant | Thiol Reactant | Thioether Product | |
|---|---|---|---|---|
| | | | (a) Monothioether Product | (b) Bisthioether Product |
| 3 | 1,2,4,4-tetrachlorohexafluorocyclohexene-1. | Benzenethiol. | 1-(phenylthio)-2,4,4-trichlorohexafluorocyclohexene-1. | 1,2-bis(phenylthio)-4,4-dichlorohexafluorocyclohexene-1. |
| 4 | 1,2,3,3-tetrachlorohexafluorocyclohexene-1. | Benzeneethanethiol. | 1-(phenylethylthio)-2,3,3-trichlorohexafluorocyclohexene-1. | 1,2-bis(phenylethylthio)-3,3-dichlorohexafluorocyclohexene-1. |
| 5 | 3,3,6,6-tetrachlorohexafluorocyclohexene-1. | Benzenehexanethiol. | 1-(phenylhexylthio)-3,3,6,6-tetrachloropentafluorocyclohexene-1. | 1,2-bis(phenylhexylthio)-3,3,6,6-tetrachlorotetrafluorocyclohexene-1. |
| 6 | 1,2,3,3,4,4,6,6-octachlorodifluorocyclohexene-1. | 4-ethylbenzenemethanethiol. | 1-(4-ethylbenzylthio)-2,3,3,4,4,6,6-heptachlorodifluorocyclohexene-1. | 1,2-bis(4-ethylbenzylthio)-3,3,4,4,6,6-hexachlorodifluorocyclohexene-1. |
| 7 | 4,5-dichlorohexafluorocyclopentene-1. | 1,4-dimethylbenzenepropanethiol. | 1-(1,4-dimethylphenylpropylthio)-4,5-dichloropentafluorocyclopentene-1. | 1,2-bis(1,4-dimethylphenylthio)-4,5-dichlorotetrafluorocyclopentene-1. |
| 8 | 1,2,3,3-tetrachlorotetrafluorocyclopentene-1. | α-Cumenethiol. | 1-(α-cumenylthio)-2,3,3-trichlorotetrafluorocyclopentene-1. | 1,2-bis(α-cumenylthio)-3,3-dichlorotetrafluorocyclopentene-1. |
| 9 | 3,3,5,5-tetrachlorotetrafluorocyclopentene-1. | 3-butylbenzenethiol. | 2-(3-butylphenylthio)-3,3,5,5-tetrachlorotrifluorocyclopentene-1. | 1,2-bis(3-butylphenylthio)-3,3,5,5-tetrachlorodifluorocyclopentene-1. |

When the inorganic bases and solvents employed in Examples 1–9 are interchanged or substituted by other inorganic bases and solvents as defined hereinbefore, substantially the same results are obtained.

EXAMPLE 10

1-(benzylthio) - 2 - chlorooctafluorocyclohexene-1 was tested as a sealing adjuvant for strips of thermoplastic film composed of a copolymer of about 96% trifluorochloroethylene and about 4% vinylidene fluoride. A saturated solution of this polymer in the thioether was prepared by refluxing the thioether with said polymer, cooling the mixture to room temperature and decanting the solution from the undissolved polymer. A pair of polymer film strips was sealed together without the use of sealing adjuvant. Another pair of polymer film strips was sealed together, this time employing as sealing adjuvant the above described polymer solution in the thioether. The thioether sealing adjuvant solution was applied by merely coating, as by brushing, the inner surfaces of the film strips to be sealed. An impulse heat sealer was used. The impulse heat sealer was a Sentinel Impulse Sealer. Sealing pressure was 30 p.s.i. The heat sealing temperature was 375° F. The dwell time for the seal, or in other words, the length of time during which the pressure and heat were applied to effect the seal, was three (3) seconds. It was attempted to test the seal strength by measuring the amount of force needed to rupture or pull apart the seal. The sealing adjuvant, however, apparently had an affect on the strength of the polymer film in the vicinity of the seal, for the polymer film ruptured before the seal, at a point away from the sealing area. As can be seen from the following table, the polymer film strip pair sealed with the adjuvant solution, ruptured at a weight considerably higher than the polymer film strip pair which was sealed without such a treatment.

*Table II*

| | Wgt. to effect rupture, g. |
|---|---|
| Film strips heat-sealed without the use of adjuvant | <10 |
| Film strips heat-sealed with a polymer solution in 1 - (benzylthio)-2-chlorooctafluorocyclohexene-1 | >1,036 |

Although a copolymer of about 96% trifluorochloroethylene and about 4% vinylidene fluoride was employed, a wide variety of polymers, terpolymers and copolymers of trifluorochloroethylene may be employed with equivalent results; homopolymeric trifluorochloroethylene and copolymers of trifluorochloroethylene with vinyl chloride, 1,1-chlorofluoroethylene, trifluoroethylene and perfluorobutadiene being exemplary. In general, most suitable are those compositions containing upwards of 50% by weight of trifluorochloroethylene. The general class of compositions described above can be referred to generically as polytrifluorochloroethylene.

When other thioether products within the scope of the invention are used as sealing adjuvants for films of polytrifluorochloroethylene, substantially the same results are obtained; that is to say, films of polytrifluorochloroethylene which are heat sealed employing such adjuvants, rupture at weights considerably higher than films of polytrifluorochloroethylene which are heat sealed without using sealing adjuvants. Thioether products which are solids under normal conditions may be employed as sealing adjuvants in substantially the same way as described above by merely working the materials at temperatures above the melting points of the solids.

Since various changes and modifications may be made without departing from the spirit of the invention, the invention is to be limited only by the scope of the appended claims.

We claim:

1. Compounds of the formula:

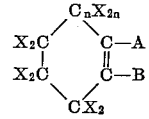

wherein X is F or Cl, $n$ is 0 or 1 and A and B are members selected from the group consisting of Cl and S—R, wherein R is a member selected from the group consisting of phenyl, phenylalkyl and alkylphenyl, with the proviso that at least one of the members A and B must be the members S—R, there being present at least one fluorine atom and one chlorine atom in the molecule.

2. Compounds according to claim 1 in which $n$ is 0.
3. Compounds according to claim 1 in which $n$ is 1.
4. Compounds according to claim 1 in which each of A and B is a S—R group.
5. Compounds according to claim 4 in which $n$ is 0.
6. Compounds according to claim 4 in which $n$ is 1.
7. Compounds according to claim 1 in which either A or B, but not both, is Cl.
8. Compounds according to claim 7 in which $n$ is 0.

9. Compounds according to claim 7 in which *n* is 1.
10. 1 - (benzylthio)-2-chlorooctafluorocyclohexene-1.
11. 1,2 - bis(benzylthio) - 3,3-dichlorohexafluorocyclohexene-1.
12. 1 - (phenylthio)-2-chlorooctafluorocyclohexene-1.
13. 1 - (phenylethylthio) - 2,3,3-trichlorohexafluorocyclohexene-1.

References Cited

Reid, Organic Chemistry of Bivalent Sulfur, vol. II, pp. 24–25 (1960), QD 412, SIR 4, C. 2.

JOSEPH P. BRUST, *Primary Examiner*.

D. R. PHILLIPS, *Assistant Examiner*.